(12) United States Patent
Ganesh et al.

(10) Patent No.: US 6,374,197 B1
(45) Date of Patent: Apr. 16, 2002

(54) FUZZY LOGIC BASED MODEL ASSESSMENT SYSTEM AND METHOD FOR CONTACT TRACKING

(75) Inventors: Chidambar Ganesh, Bristol; Kai F. Gong, Pawtucket, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/313,575

(22) Filed: May 10, 1999

(51) Int. Cl.$^7$ ................................................. G01S 7/66
(52) U.S. Cl. ....................... 702/191; 702/123; 702/182; 702/81; 702/179
(58) Field of Search ............................. 702/58, 59, 81, 702/123, 179–181, 182–185, 188, FOR 103, 104, 134, 135, 136, 137, 139, 170, 171; 700/30, 50; 706/1, 52, 21, 900, 8; 703/2

(56) References Cited

U.S. PATENT DOCUMENTS

| | | | | |
|---|---|---|---|---|
| 4,860,214 A | * | 8/1989 | Mastsuda et al. | 364/513 |
| 5,051,932 A | * | 9/1991 | Inoue et al. | 364/550 |
| 5,245,528 A | * | 9/1993 | Satio et al. | 364/161 |
| 5,251,285 A | * | 10/1993 | Inoue et al. | 395/10 |
| 5,377,308 A | * | 12/1994 | Inoue et al. | 395/61 |
| 5,410,470 A | * | 4/1995 | Yamaoka et al. | 364/165 |
| 5,472,273 A | * | 12/1995 | Fowler et al. | 366/69 |
| 5,493,729 A | * | 2/1996 | Nigawara et al. | 395/61 |
| 5,581,490 A | * | 12/1996 | Ferkinhoff et al. | 364/578 |
| 5,796,917 A | * | 8/1998 | Matranga et al. | 395/3 |
| 5,819,007 A | * | 10/1998 | Elghazzawi | 395/51 |
| 5,998,769 A | * | 12/1999 | Le Van Suu | 219/506 |

* cited by examiner

*Primary Examiner*—Marc S. Hoff
*Assistant Examiner*—Carol S Tsai
(74) *Attorney, Agent, or Firm*—Michael J. McGowan; Michael F. Oglo; Prithvi C. Lall

(57) ABSTRACT

A fuzzy logic based model assessment system assesses models of physical phenomena and in one example, is used for contact tracking. The system uses measurement residual values representing the difference between a measured data sequence corresponding to the physical phenomena and an expected data sequence corresponding to the model to be assessed. The system includes a feature identification module for identifying one or more features or tracking anomalies in the measurement residual values, such as jump and drift, and for generating feature amplitude values and feature amplitude standard deviation values. An anomaly characterization module characterizes the features in one or more membership classes representing the strength of the identified feature and generates class membership intervals representing a range of degrees of membership in each of the classes (e.g., null, weak, moderate or strong). A hypothesis formulation and evaluation module determines one or more possible causes of mismodeling by applying fuzzy inferencing to the class memberships, and generates hypothesis certainty intervals representing a range of degrees of certainty of the mismodeling hypothesis based on the class membership intervals. A knowledge base of heuristic rules are used to infer the mismodeling hypotheses based upon the membership classes.

26 Claims, 6 Drawing Sheets

FUZZY LOGIC BASED MODEL ASSESSMENT SYSTEM AND METHOD FOR CONTACT TRACKING

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

The present invention relates generally to the scientific field of optimal estimation, and more particularly, relates to a model assessment system and method used in the area of contact tracking or target motion analysis that is based on fuzzy logic inferencing methods.

(2) Description of the Prior Art

Expert systems can be used to identify likely models of physical phenomena in response to information about the state of the phenomena. One type of physical phenomena that can be modeled is the motion of a signal source moving in a medium where the signal propagated through the medium is corrupted by noise.

In an underwater environment, for example, localization and tracking of an acoustic contact from sonar measurements are of considerable interest. Several estimation techniques have been applied to the tracking problem with varying results. The differences in techniques involve (1) the modeling of the process, and (2) the selection and formulation of the estimation algorithm. Sources of uncertainty in the modeling process include assumptions on contact kinematics, acoustic propagation mechanisms and measurement noise characteristics. Understanding and conveying the impact of these uncertainties on overall system performance is a critical issue. Model assessment is a crucial phase of contact tracking, leading to an appraisal of the system performance in the presence of modeling uncertainties. Model assessment involves identification of features from measurement residuals for formulation of possible causes of mismodeling associated with the system models employed in the tracking process.

A hierarchical approach to filtering and estimation for contact tracking was first proposed by A. G. Lindgren, et al., "Nonlinear Parameter Estimation With Segmented Data: Trajectory Estimation With Biased Measurements", Proceedings of the 19th IEEE Asilomar Conference on Signals, Systems and Computers, pp. 349–353, November, 1985, incorporated herein by reference, and has been developed for generation of a tactical picture, as disclosed by K. F. Gong et al., "Intelligent Data Integration for Tactical Picture Generation: Performance Analysis of Advanced Techniques", TTCP Subgroup G Symposium on Shallow Water Undersea Warfare, Nova Scotia, October, 1996, incorporated herein by reference. The hierarchical model of intelligent data integration for generation of the tactical picture is shown generally in FIG. 1. This process entails (1) data conditioning, which associates and characterizes available data, and provides uncertainty descriptions; (2) data processing, which processes the conditioned data to form and maintain contact tracks, propagates the uncertainties, and provides for uncertainty descriptions associated with the resulting tracks; (3) model assessment, which detects, interprets and resolves anomalies due to uncertainties in modeling assumptions; and (4) the process controller, which provides for scenario driven adaptive processing by appropriate selection of data, models and algorithms.

Conventional approaches for propagation of uncertainty in contract tracking have primarily focused on probabilistic techniques, as disclosed by V. J. Aidala, "Kalman Filter Behavior in Bearings-Only Tracking Applications", *IEEE Transactions on Aerospace and Electronic Systems,* Vol. AES-15, No. 1, pp. 29–39, January, 1979, incorporated herein by reference. In particular, Bayesian methods have been used. The quality of the estimated track is evaluated based on a priori knowledge of statistical uncertainties associated with the sensor measurements and the process model, i.e., input and modeling uncertainties. These uncertainties are typically represented as additive white Gaussian noise and are propagated through the conditional covariance matrix to form containment regions that indicate the final uncertainty associated with the contact state estimate, as described in S. C. Nardone et al., "Fundamental Properties and Performance of Conventional Bearings-Only Target Motion Analysis", *IEEE Transactions on Automatic Control,* Vol. AC-29, No. 9, pp. 775–787, September, 1984, incorporated herein by reference. Mismodeling in the tracking process has a severe impact on the integrity of the estimate and the uncertainties associated with those estimates. This includes erroneous assumptions, such as constant contact velocity, known acoustic propagation path and Gaussian noise distributions, as well as erroneous model-order approximation.

To alleviate these difficulties in modeling, a contact management model assessment algorithm using the Dempster-Shafer approach has been developed, as disclosed in U.S. Pat. No. 5,581,490 issued to Ferkinhoff et al., and incorporated herein by reference. The Dempster-Shafer Theory of Evidential Reasoning represents a generalization of Bayesian probability for producing inferences from uncertain information. The results using this approach, however, can be inconclusive if there is a high degree of conflict in the evidence.

SUMMARY OF THE INVENTION

It is therefore an object of the invention to provide a model assessment system and method for contact tracking that uses fuzzy logic.

The present invention features a fuzzy logic based model assessment system for assessing at least one model of physical phenomena using measurement residual values representing a difference between a measured data sequence corresponding to the physical phenomena and an expected data sequence corresponding to the model to be assessed. The system comprises a feature identification module that identifies one or more features present in the measurement residual values and generates one or more feature amplitude values and feature amplitude standard deviation values. The system also comprises an anomaly characterization module that characterizes the features in one or more membership classes based upon the feature amplitude value and generates class membership interval values for each membership class based upon the feature amplitude standard deviation value. The class membership interval values represent a range of degrees of membership in each of the membership classes. The system further comprises a hypothesis formulation and evaluation module for determining at least one mismodeling hypothesis by applying fuzzy inferencing to the class memberships, and generates at least one hypothesis certainty interval value representing a range of degree of certainty of the mismodeling hypothesis.

According to one example, the physical phenomena includes a moving contact, the model is a contact tracking model, and the one or more features include one or more tracking anomalies. Examples of the tracking anomalies include a jump feature representing a discontinuity in a measured tracking signal and a drift feature representing a generally-linear drift of the measured tracking signal. Examples of the membership classes include null, weak, moderate and strong. The class membership interval values preferably include an upper limit value representing the greatest possible extent to which the feature belongs to the membership class and includes a lower limit value representing the smallest necessary extent to which the feature belongs to the membership class. The hypothesis certainty value also preferably includes hypothesis certainty interval values representing a range of certainty for the mismodeling hypotheses.

According to one embodiment, the hypothesis formulation and evaluation module includes a knowledge base and an inferencing module. The knowledge base includes a plurality of rules for inferring one or more mismodeling hypotheses based upon features and their corresponding membership classes. The inferencing module applies one or more rules from the knowledge base to the class memberships, selects one or more mismodeling hypotheses based upon the rule, and generates hypothesis certainty interval values representing a range of certainty for the selected mismodeling hypothesis based on the class membership interval values. The hypothesis formulation and evaluation module can also include an aggregation module. Where the inferencing module applies a plurality of rules that results in the same mismodeling hypothesis with different hypothesis certainty interval values, the aggregation module aggregates the hypothesis certainty interval values to generate a composite hypothesis certainty interval value for the mismodeling hypothesis.

The present invention also features a fuzzy inference system for use with a model assessment system comprising the anomaly characterization module and the hypothesis formulation and evaluation module as described above. According to one embodiment, the feature identification module, anomaly characterization module, and hypothesis formulation and evaluation module are implemented on a computer.

The present invention also features a method of assessing one or more models of physical phenomena in response to a measured data sequence representing a signal caused by the physical phenomena in the presence of noise. The method comprises providing measurement residual values representing a difference between the measured data sequence and an expected data sequence corresponding to the model to be assessed. One or more features are then identified in the measurement residual values, and one or more feature amplitude values and feature amplitude standard deviation values are generated for the identified feature. The feature is then characterized in one or more membership classes based upon the feature amplitude value, and class membership interval values are generated for each of the membership classes based upon the feature amplitude standard deviation value. One or more mismodeling hypotheses are then determined by applying fuzzy inferencing to the class memberships and one or more hypotheses certainty interval values are generated, representing a degree of certainty of the mismodeling hypothesis. The method can also include the step of using the mismodeling hypothesis and the hypothesis certainty values to assess the model and generate a tactical picture.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
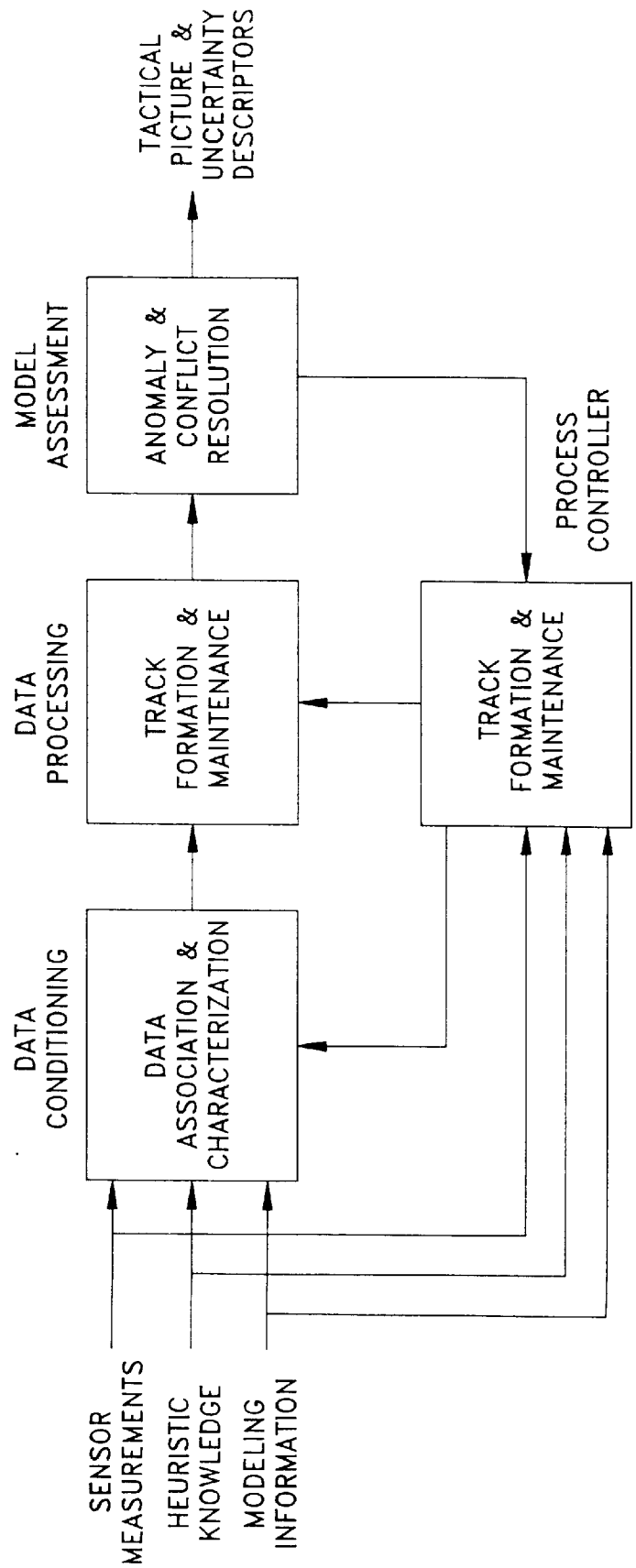
FIG. 1 is a functional block diagram of a hierarchical model of intelligent data integration for tactical picture generation, according to the prior art.
Figure 2:
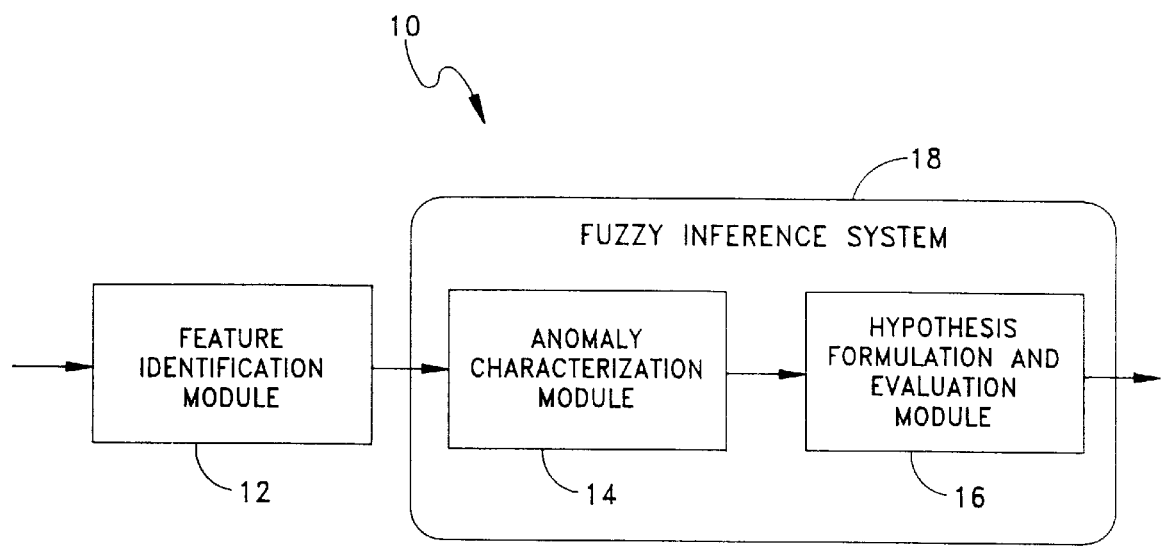
FIG. 2 is a functional block diagram of a fuzzy logic based model assessment system, according to the present invention.
Figure 3:
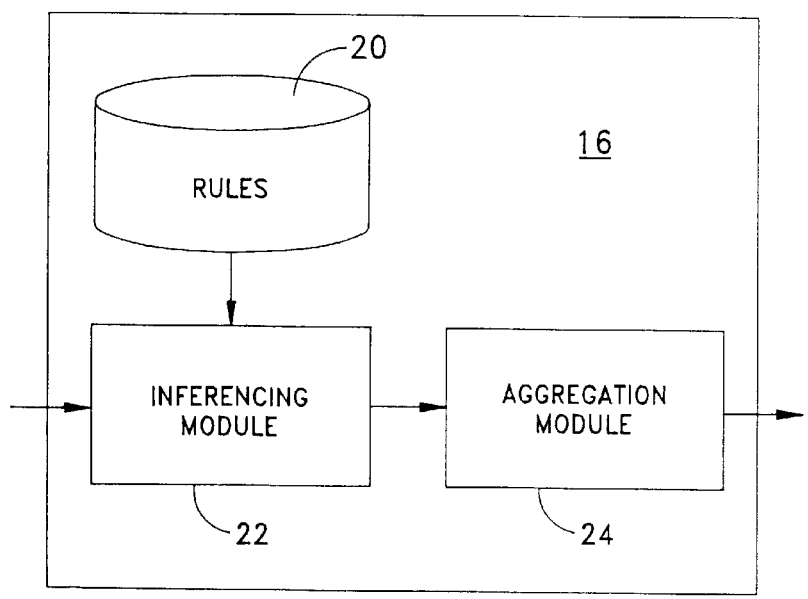
FIG. 3 is a functional block diagram of a fuzzy inference system for use in the model assessment system, according to one embodiment of the present invention.
Figure 4:
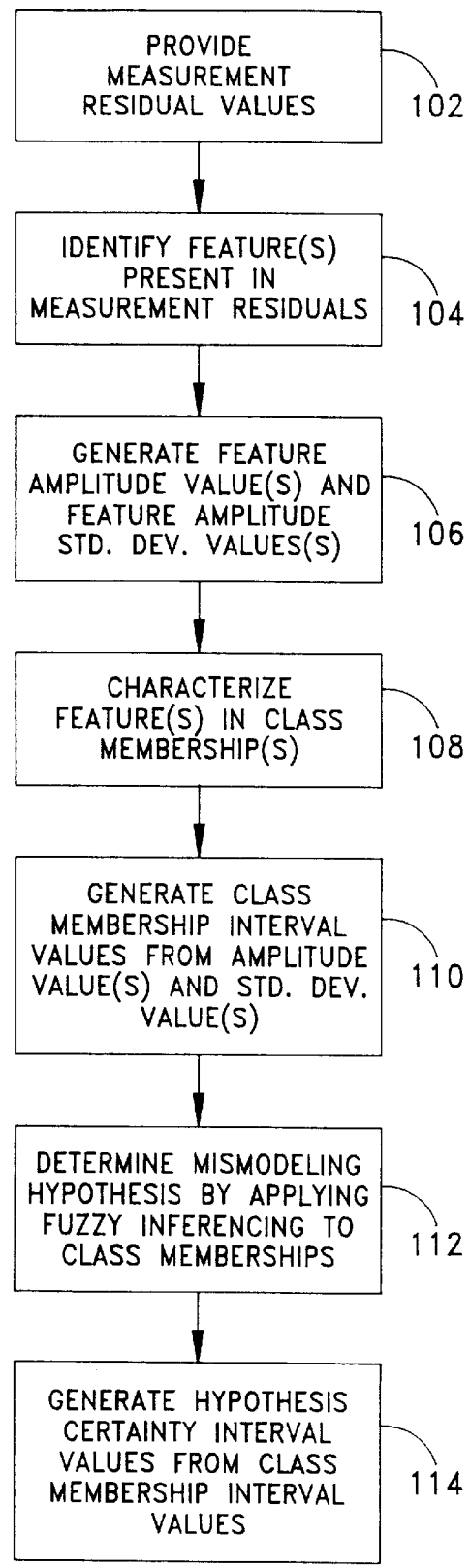
FIG. 4 is a flow chart illustrating the fuzzy logic based assessment method, according to the present invention.

A fuzzy logic based model assessment system 10, FIG. 2, is used to assess one or more models of physical phenomena, such as a moving acoustic signal source. In one application, the model assessment system 10 is used for contact tracking or target motion analysis, for example, in military applications. The fuzzy logic based model assessment system uses fuzzy logic inferencing techniques to formulate possible causes of mismodeling associated with the models employed in the tracking process or other physical phenomena. The present invention also contemplates using the fuzzy logic based model assessment system 10 to assess models of other types of physical phenomena that can be measured.

The fuzzy logic based model assessment system 10 generally includes a feature identification module 12, an anomaly characterization module 14, and a hypothesis formulation and evaluation module 16. The anomaly characterization module 14 and the hypothesis formulation and evaluation module 16 together form a fuzzy inference system 18. The various modules of the present invention can be implemented using special purpose hardware and/or one or more suitably programmed general purpose computers.

The feature identification module 12 generates evidence for use in model assessment by identifying features or tracking anomalies present in measurement residuals. In the exemplary embodiment, measurement residuals are obtained by detecting the acoustic signal emitted by the contact or target and generating a measured data sequence. The difference values between the measured data sequence and an expected data sequence corresponding to the model being assessed form a measurement residual sequence. In the exemplary embodiment, the features identified in the measurement residuals represent tracking anomalies, such as jump, drift and curvature. A jump feature represents a discontinuity in a measured tracking signal. A drift feature represents a generally linear drift of the measured tracking signal. A curvature feature represents a non-linear drift of the signal.

The measurement residuals are assumed to have a zero-mean Gaussian distribution when the correct tracking model is employed. Thus, deviations from a random white noise sequence in the measurement residuals indicates the presence of mismodeling. The evidence generated by the feature identification module 12 includes the amplitudes of the identified features, representing the strength of the features and includes the standard deviation of the amplitudes, representing a probabilistic description of the uncertainty associated with the feature strength.

The fuzzy inference system 18 then applies fuzzy logic based inferencing to characterize and interpret this evidence and to formulate possible causes of mismodeling in the system models (i.e., mismodeling hypotheses) and to generate fuzzy measures of certainty in the mismodeling hypotheses. The fuzzy measure of certainty is used to evaluate the confidence associated with the different mismodeling hypotheses and can be used, for example, to generate a tactical picture.

The anomaly characterization module 14 within the fuzzy inference system 18 characterizes the features or anomalies in terms of fuzzy input class memberships. The input class memberships represent the strength of the feature or tracking anomaly and include null (feature not present), weak, moderate and strong. The uncertainty in the feature amplitudes, as described by the standard deviation, results in a membership function of amplitude as opposed to a finite value. Thus, the anomaly characterization module 14 uses interval-valued fuzzy logic to handle the possible variability in the input data to the fuzzy inference system 18. The uncertainty in the input data results in an interval-valued set membership where the feature amplitude belongs to a particular class within a membership interval, as opposed to a finite membership value, as will be described in greater detail below.

The hypothesis formulation and evaluation module 16 within the fuzzy inference system 18 determines mismodeling hypotheses through the application of fuzzy inferencing to the anomaly characterizations, or input class memberships. The hypothesis formulation and evaluation module 16 also computes certainties associated with the various possible hypotheses and preferably provides fuzzy measures of confidence in each particular hypothesis.

According to the preferred embodiment, the hypothesis formulation and evaluation module 16, FIG. 2, is a fuzzy inference engine having a knowledge base 20 including a plurality of heuristic rules that are derived from problem-domain experience and expertise. Each rule is an IF-THEN relationship that infers possible causes of mismodeling (i.e., mismodeling hypotheses) based on combinations of observed effects (i.e., features or tracking anomalies). In one example, the heuristics for fuzzy inferencing are formulated based on prior work and model assessment using, for example, a combination of perturbation analysis (both numerical and analytical) and expert knowledge to form compatibility maps for Dempster-Shafer evidential reasoning methods. The rules in the knowledge base 20 are then derived from the compatibility maps.

An inferencing module 22 triggers one or more of the rules in the knowledge base 20 based upon the input class memberships and selects one or more mismodeling hypotheses by applying the rules to the input class memberships. A given combination of inputs, such as input class memberships and class membership intervals, can trigger several rules. An aggregation module 24 combines the outputs of the rules applied by the inferencing module 22 to evaluate the possible hypotheses in terms of their associated certainty.

The operation of the fuzzy logic based model assessment system 10 will be described in greater detail in connection with FIGS. 4 through 12. The method of assessing a model using the fuzzy logic based model assessment system 10, FIG. 4, begins by providing measurement residual values to the feature identification module 12, step 102. The feature identification module 12 then identifies the features present in the measurement residual values, step 104, and generates a feature amplitude value and feature amplitude standard deviation value for each feature identified, step 106.

According to one example, statistical methods are used to identify the features present in the measurement residual sequence. The features are extracted from a regression fit of a second-order polynomial to the measurement residuals, as disclosed in greater detail in U.S. Pat. No. 5,581,490 to Ferkinhoff et al., incorporated herein by reference. The coefficients of the regression fit are the jump, drift and curvature features, together with their associated uncertainties as represented by the covariance matrix.

Figure 6:
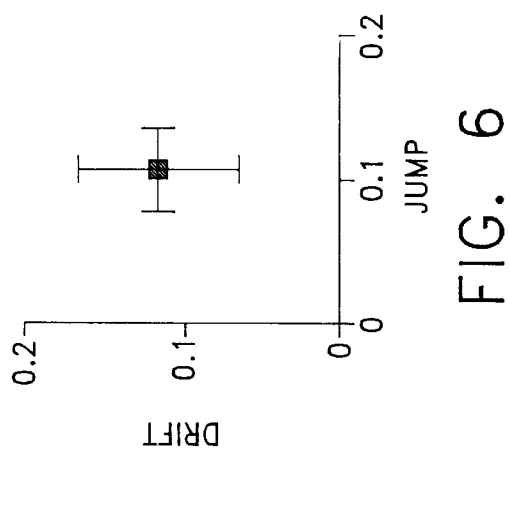
FIG. 6 is a graphical representation of identified features with respective amplitudes and standard deviations, according to one example of the present invention.
Figure 5:
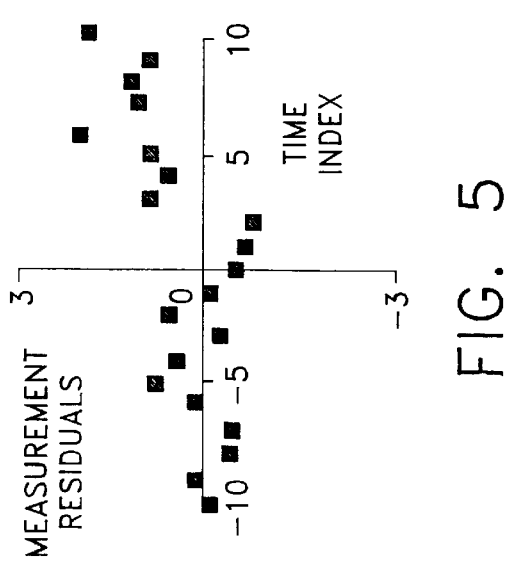
FIG. 5 is a graphical representation of measurement residual data used to identify features or anomalies, according to one example of the present invention.

One example of a measurement residual sequence representing the difference between a measured data sequence and an expected data sequence is shown in FIG. 5. When the measurement residual sequence, according to this example, is processed by the feature identification module 12, jump and drift features are identified in the measurement residual sequence having respective amplitudes j=0.11 and d=0.12, and respective standard deviations of $\sigma_j$=0.01 and $\sigma_d$=0.02. A graphical illustration of the amplitude values and standard deviations for the identified jump and drift features is shown in FIG. 6.

The peak value of the Gaussian distribution for the features of N(mean, std_dev) is then normalized to unity according to the equation:

$$\eta(\bar{\chi},\sigma)=N(\bar{\chi},\sigma)*\sqrt{2\pi}\sigma \tag{1}$$

Figure 7B:
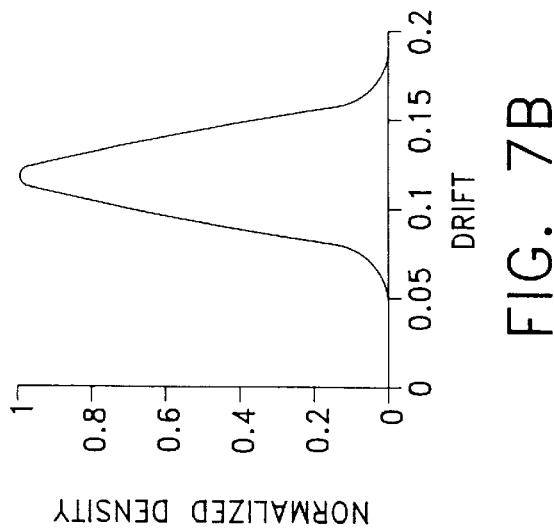
FIGS. 7A and 7B are graphical representations of normalized distributions of the identified features, according to one example of the present invention.
Figure 7A:
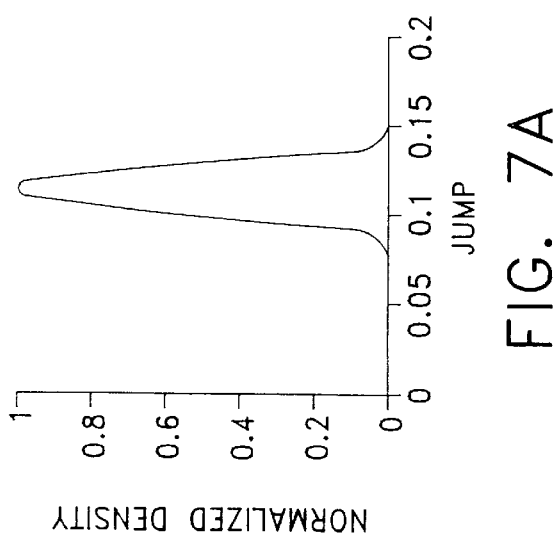

The resulting normalized anomaly distributions for the jump feature $\mu_J(j)=\eta(0.11,0.01)$ and the drift feature $\mu_D(d)=\eta(0.12,0.02)$ are shown in FIGS. 7A and 7B respectively.

Figure 8A:
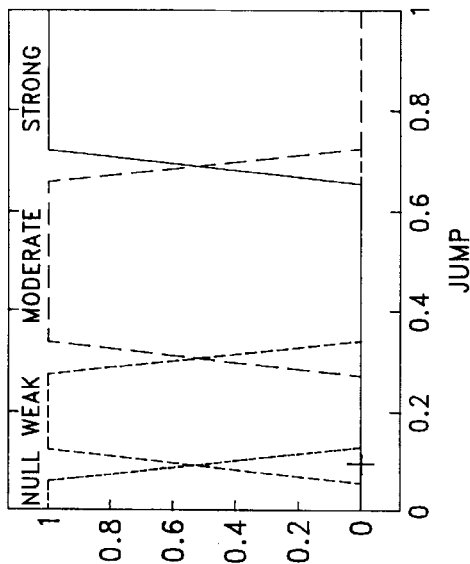
FIGS. 8A and 8B are graphical representations of class memberships of the identified feature, according to one example of the present invention.
Figure 8B:
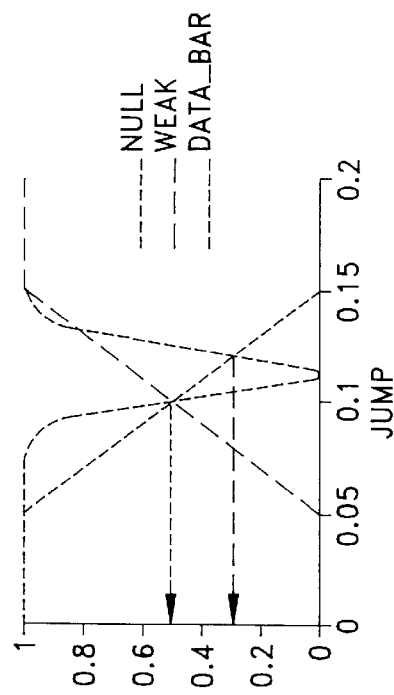

The feature amplitude values and the feature amplitude standard deviation values constitute the tracking anomaly evidence that is input to the fuzzy inference system 18. The anomaly characterization module 14 characterizes the identified features in one or more membership classes based upon the feature amplitude values, step 108. In a conventional Boolean logic approach, the membership classes or term sets are separated by hard limits or "crisp" boundaries in that a particular feature amplitude value belongs to one and only one class, as shown in FIG. 8A. In the fuzzy logic approach of the present invention, the amplitude values can belong to more than one class with varying degrees of membership, as shown in FIG. 8B. In the example shown, the jump feature having amplitude value j=0.11 has memberships $\mu_{NULL}(j)=0.4$ in the set null and $\mu_{WEAK}(j)=0.6$ in the set weak, respectively.

The anomaly characterization module 14 also generates class membership interval values for each membership class based upon the feature amplitude standard deviation values, step 110. The class membership interval values include a lower limit N, denoted as necessity, which represents the smallest necessary extent to which the feature amplitude belongs to the membership class, and an upper limit P, denoted as possibility, which represents the greatest possible extent to which the feature amplitude belongs to the membership class. The lower limit N and upper limit P are calculated as follows:

Let $\mu_M(\chi)$ represent the membership function of input data M over variable $\chi \in X$. Then membership interval of data M in term set T is $$\mu_T(M) = [N, P] = [N_T(M), P_T(M)] \quad (2)$$

where $$P = P_T(M) \equiv \sup_{\forall \chi \in X} [\min(\mu_M(\chi), \mu_T(\chi))] \quad (3)$$

represents the greatest possible extent to which data M belongs to term set T; and necessity $$N = N_T(M) \equiv \inf_{\forall \chi \in X} [\max(\mu_{\overline{M}}(\chi), \mu_T(\chi))] \quad (4)$$

represents the smallest necessary extent to which data M belongs to term set T.

Here, $\overline{M}$ is defined as the complement of set M:

$$\mu_{\overline{M}}(\chi) = 1 - \mu_M(\chi) \quad (5)$$

Figure 9A:
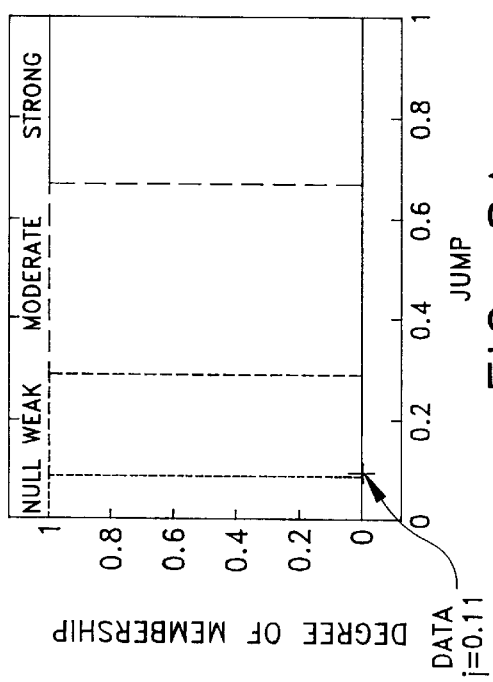
FIGS. 9A and 9B are graphical representations of class membership interval values for an identified feature, according to one example of the present invention.
Figure 9B:
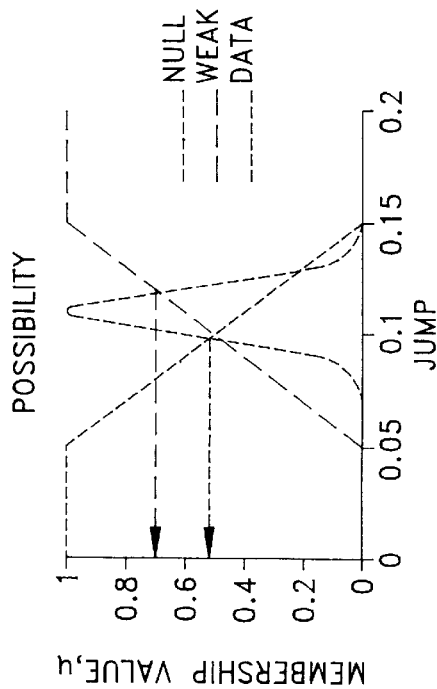

In the example having the jump distribution $\mu_j(j) = \eta(0.11, 0.01)$, the membership interval values include $\mu_{NULL}(J) = [0.31, 0.52]$ in the set null (compared with membership 0.4 in null for the discrete value of j=0.11), and $\mu_{WEAK}(J) = [0.48, 0.68]$ in the set weak (compared with membership 0.6 in weak for the discrete value of j=0.11). The possibility values according to this example are shown in FIG. 9A and the necessity values according to this example as shown in FIG. 9B.

The hypothesis formulation and evaluation module 16 then determines one or more mismodeling hypotheses by applying fuzzy inferencing to the class memberships, step 112. According to one example, the knowledge base 20 includes rules for a sphere-bearing measurement type. A sphere-bearing is the azimuthal angle from an observer to a contact or target with the direction north as a zero reference measured, for example, by sonar on a submarine hull. For a sphere-bearing measurement type, the possible mismodeling hypotheses include a null hypothesis (H0), a base frequency shift (BF) where the fundamental acoustic frequency of sound waves emitted by the contact has shifted, a propagation path change (PP) where the mode of traversal of the sound waves from the contact to the observer (e.g., the direct path or bottom bounce path) has changed, and contact maneuver (CM) where the contact has changed in course and/or speed, and unknown (UK). Examples of the fuzzy inference rules that infer one or more of these mismodeling hypotheses based upon the features or tracking anomalies are as follows:

1. IF ((jump is strong) OR (drift is strong)) THEN (hypothesis is UK)
2. IF (((jump is moderate) OR (jump is weak)) AND ((drift is moderate) OR (drift is weak))) THEN (hypothesis is CM).
3. IF (((jump is moderate) OR (jump is weak) AND (drift is null)) THEN (hypothesis is CM)
4. IF ((jump is null) AND ((drift is moderate) OR (drift is weak))) THEN (hypothesis is CM)
5. IF ((jump is null) AND (drift is null)) THEN ((hypothesis is HO) OR (hypothesis is PP) or (hypothesis is BF))

Figure 10:
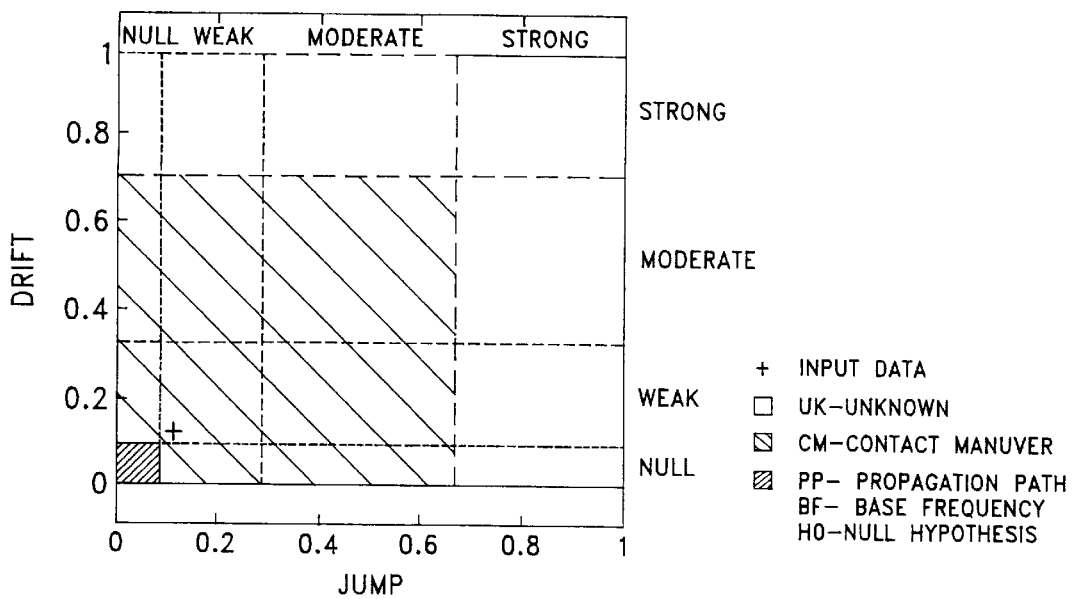
FIG. 10 is a graphical representation of a map of rules used to infer mismodeling hypotheses based upon the membership classes of the identified features, according to one example of the present invention.

The mapping of these rules applied to sphere-bearing measurement types is shown in FIG. 10. Note that the output hypotheses boundaries are not crisp as shown, rather they represent the crossover lines in the transition from one class to the next.

Figure 11A:
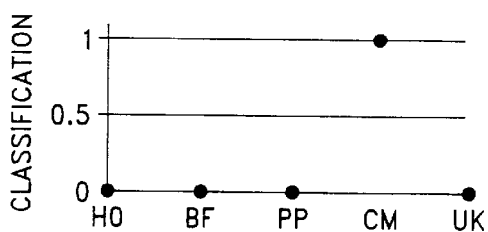
FIGS. 11A and 11B are graphical representations of mismodeling hypotheses and hypotheses certainty values determined based upon membership class values, according to one example of the present invention.
Figure 11B:
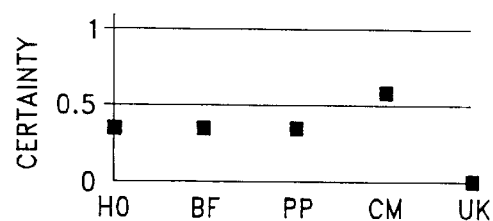

The hypothesis formulation and evaluation module 16 also generates one or more certainty values representing a degree of certainty in the mismodeling hypotheses, step 114. Processing a sphere-bearing measurement residual sequence, for example, using anomaly amplitudes only with the conventional Boolean approach results in the CM hypothesis with a probability of 1, as shown in FIG. 11A. The fuzzy logic approach of the present invention results in 2 alternative hypotheses: CM with certainty 0.6 and (HO or BF or PP) with certainty 0.3, as shown in FIG. 11B. The computational process from single-valued fuzzy logic is as follows:

Let $\mu_{T1}(m1)$ be the membership value of data-point m1 in term set T1.

Let $\mu_{T2}(m2)$ be the membership value of data-point m2 in term set T2.

Consider the heuristic rule: IF ((m1 is T1) .AND. (m2 is T2)) THEN (hypothesis is H1)

Then premise A=(m1 is T1) .AND. (m2 is T2)) has the strength value:

$$v(A) \equiv [\text{AND}(\mu_{T1}(m1), \mu_{T2}(m2))] \quad (6)$$

And conclusion B=(hypothesis is H1) has the certainty value:

$$v(B) \equiv [\text{AND}(v(A), v(A \rightarrow B))] \quad (7)$$

where $v(A \rightarrow B)$ denotes the strength of the rule sufficiency: IF (premise A) THEN (conclusion B). Typically the logical AND operator is the min function, while the rule sufficiency $v(A \rightarrow B) = 1$. This results in the certainty of conclusion B being equal to the strength of premise A; that is, $v(B) = v(A)$.

Figure 12A:
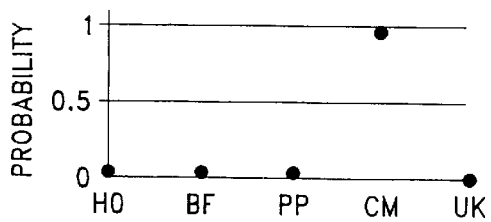
FIGS. 12A and 12B are graphical representations of mismodeling hypotheses certainty interval values derived from membership class interval values, according to one example of the present invention.
Figure 12B:
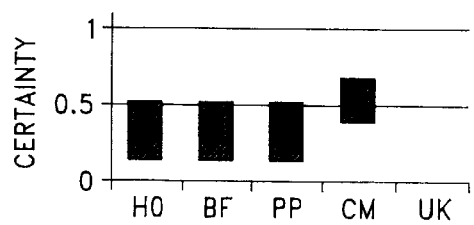

In the fuzzy logic based model assessment system 10 of the present invention, the anomaly distributions are preferably handled using an interval-valued fuzzy logic approach. The class membership interval values for a particular anomaly distribution in an input class are propagated through the fuzzy inference engine 16 to provide certainty intervals pertaining to the feasible mismodeling hypotheses, as shown in FIG. 12B. The certainty interval is a range of certainty on a particular mismodeling hypothesis and indicates the fuzzy confidence in that hypothesis.

The method for propagating membership class interval values through the inferencing module 22 of the fuzzy inference engine to generate certainty interval values is as follows:

Let $\mu_{T1}(M1) = [N_{T1}(M1) P_{T1}(M1)]$ be the membership interval of data-set M1 in term set T1.

Let $\mu_{T2}(M2)=[N_{T2}(M2)P_{T2}(M2)]$ be the membership interval of data-set M2 in term set T2.

Consider the heuristic rule: IF ((M1 is T1) .AND. (M2 is T2)) THEN (hypothesis is H1).

This rule is of the form: IF (premise A) THEN (conclusion B).

The premise A =((M1 is T1) .AND. (M2 is T2)) has the strength interval:

$$[v_L(A),v_U(A)]=[AND(N_{T1}(M1),N_{T2}(M2)),AND(P_{T1}(M1),P_{T2}(M2))] \quad (8)$$

The conclusion B=(hypothesis is H1) has the certainty interval:

$$[v_L(B),v_U(B)]=[AND(v_L(A),v(A \to B)),OR(v_U(A),1-v(B \to A))] \quad (9)$$

where $v(A \to B)$ denotes the strength of the rule sufficiency: IF (premise A) THEN (conclusion B)

and $v(B \to A)$ denotes the strength of the rule necessity: IF (conclusion B) THEN (premise A)

Typically, the logical AND and OR operators are implemented with the min and max functions, while the rule sufficiency $v(A \to B)$=necessity $v(B \to A)$=1. This results in a simplified expression for the certainty interval of conclusion B; Equation (9) reduces to the equivalent of the strength of premise A. That is, $[v_L(B),v_U(B)]=[v_L(A),v_U(A)]$.

When multiple rules are triggered to give the same conclusion or mismodeling hypothesis with different levels of certainty, the certainty values are aggregated by the aggregation module 24 to provide a composite certainty value on the output conclusion. Using single-valued fuzzy logic (FIG. 11B), the logical OR is used to aggregate the different certainties, i.e., C=max(C1, C2, C3 . . . ). Where certainty intervals [L1, U1], [L2, U2], [L3, U3] . . . are generated using interval valued fuzzy logic and interval valued membership inputs (FIG. 12B), the aggregated certainty interval on the output conclusion is [L, U] where the lower limit, L=max(L1, L2, L3 . . . ) and the upper limit U=max(U1, U2, U3 . . . ).

In the example above, the jump amplitude distribution of $\mu_j(j)=\eta(0.11,0.01)$ results in fuzzy input class membership intervals of $\mu_{NULL}(J)=[0.31,052]$ and $\mu_{WEAK}(J)=[0.48,0.68]$ and the drift amplitude distribution of $\mu_D(d)=\eta(0.12,0.03)$ results in membership intervals of $\mu_{NULL}(D)=[0.14,0.60]$ and $\mu_{WEAK}(D)=[0.40,0.86]$. The propagation of these interval valued memberships through the fuzzy inference engine gives the hypothesis CM with certainty interval [0.40, 0.68] and the hypothesis (HO OR BF OR PP) with certainty interval [0.14, 0.52]. The hypotheses and certainty intervals for this example are shown in FIG. 12B. In contrast, conventional Bayesian analysis results in a hypothesis CM with probability 0.96 and hypothesis (HO OR BF OR PP) with probability 0.04, as shown in FIG. 12A.

Accordingly, the fuzzy logic based model assessment system of the present invention uses heuristic domain knowledge and fuzzy logic reasoning to assess a model of a physical process or phenomena even if there is a high degree of conflict in the evidence. Input data uncertainty as represented by the standard deviation of the anomaly or feature amplitudes is characterized by interval-valued memberships in fuzzy input classes and is propagated to output information certainty, expressed in terms of certainty intervals on the mismodeling hypothesis.

In light of the above, it is therefore understood that within the scope of the appended claims, the invention may be practiced otherwise than as specifically described.

What is claimed is:

1. A fuzzy logic based model assessment system for assessing at least one model of physical phenomena using measurement residual values representing a difference between a measured data sequence corresponding to said physical phenomena and an expected data sequence corresponding to said model to be assessed, said system comprising:

a feature identification module for identifying at least one feature present in said measurement residual values, and for generating at least one feature amplitude value and at least one feature amplitude standard deviation value;

an anomaly characterization module for characterizing said at least one feature in at least one membership class based upon said at least one feature amplitude value, and for generating class membership interval values for each said at least one membership class based upon said at least one feature amplitude standard deviation value, and wherein said class membership interval values represent a range of degrees of membership in each said at least one membership class; and a hypothesis formulation and evaluation module for determining at least one mismodeling hypothesis by applying fuzzy inferencing to said class membership interval values, and for generating at least one hypothesis certainty value representing a degree of certainty of said at least one mismodeling hypothesis.

2. The system of claim 1 wherein said physical phenomena includes a moving contact, wherein said at least one model is a contact tracking model, and wherein said at least one feature includes at least one tracking anomaly.

3. The system of claim 2 wherein said at least one tracking anomaly includes a jump feature representing a discontinuity in a measured tracking signal and includes a drift feature representing a generally linear drift of said measured tracking signal.

4. The system of claim 1 wherein said at least one membership class includes one of null, weak, moderate and strong.

5. The system of claim 1 wherein said class membership interval values include an upper limit representing a greatest possible extent to which said at least one feature belongs to each said at least one membership class and includes a lower limit value representing a smallest necessary extent to which said at least one feature belongs to each said at least one membership class.

6. The system of claim 1 wherein said at least one hypothesis certainty value includes hypothesis certainty interval values representing a range of certainty for said at least one mismodeling hypothesis.

7. The system of claim 1 wherein said hypothesis formulation and evaluation module includes:

a knowledge base including a plurality of rules for inferring at least one mismodeling hypotheses based upon features and membership classes; and an inferencing module for applying at least one rule from said knowledge base to said class membership interval values, for selecting at least one selected mismodeling hypothesis based upon said class membership interval values and said at least one rule, and for generating hypothesis certainty interval values representing a range of certainty for said at least one selected mismodeling hypothesis.

8. The system of claim 7 wherein said inferencing module applies a plurality of rules that result in the same said at least one mismodeling hypothesis with different said hypothesis certainty interval values, and further including an aggregation module for aggregating said hypothesis certainty interval values to generate a composite hypothesis certainty interval value for said at least one mismodeling hypothesis.

9. The system of claim 1 wherein said feature identification module, said anomaly characterization module, and said hypothesis formulation and evaluation module are implemented on a computer.

10. A fuzzy inference system for use with a model assessment system to infer possible causes of mismodeling in at least one model of physical phenomena based upon at least one feature identified in measurement residual values, wherein said at least one feature is represented by at least one feature amplitude value and at least one feature amplitude standard deviation value, said system comprising:

an anomaly characterization module for characterizing said at least one feature in at least one membership class based upon said at least one feature amplitude value, and for generating class membership interval values for each said at least one membership class based upon said at least one feature amplitude standard deviation value, and wherein said class membership interval values represent a range of degrees of membership in each said at least one membership class and include an upper limit representing a greatest possible extent to which said at least one feature belongs to each said at least one membership class and includes a lower limit value representing a smallest necessary extent to which said at least one feature belongs to each said at least one membership class; and a hypothesis formulation and evaluation module for determining at least one mismodeling hypothesis by applying fuzzy inferencing to said class membership interval values, and for generating at least one hypothesis certainty value representing a degree of certainty of said at least one mismodeling hypothesis.

11. The system of claim 10 wherein said physical phenomena includes a moving contact, wherein said at least one model is a contact tracking model, and wherein said at least one feature includes at least one tracking anomaly.

12. The system of claim 11 wherein said at least one tracking anomaly includes a jump feature representing a discontinuity in a measured tracking signal and includes drift feature representing a generally linear drift of said measured tracking signal.

13. The system of claim 10 wherein said at least one membership class includes null, weak, moderate or strong.

14. The system of claim 10 wherein said at least one hypothesis certainty value includes hypothesis certainty interval values representing a range of certainty for said at least one mismodeling hypothesis.

15. The system of claim 10 wherein said hypothesis formulation and evaluation module includes:

a knowledge base including a plurality of rules for inferring mismodeling hypotheses based upon features and membership classes; and an inferencing module for applying at least one rule from said knowledge base to said class membership interval values, for selecting at least one selected mismodeling hypothesis based upon said class membership interval values and said at least one rule, and for generating hypothesis certainty interval values representing a range of certainty for said at least one selected mismodeling hypothesis.

16. The system of claim 10 wherein said anomaly characterization module and said hypothesis formulation and evaluation module are implemented on a computer.

17. A method of assessing at least one model of physical phenomena in response to a measured data sequence representing a signal caused by said physical phenomena in the presence of noise, said method comprising:

providing measurement residual values representing a difference between said measured data sequence and an expected data sequence corresponding to said model to be assessed;

identifying at least one feature present in said measurement residual values;

generating at least one feature amplitude value and at least one feature amplitude standard deviation value for said at least one feature identified;

characterizing said at least one feature in at least one membership class based upon said at least one feature amplitude value;

generating class membership interval values for each said at least one membership class based upon said at least one feature amplitude standard deviation value, and wherein said class membership interval values represent a range of degrees of membership in each said at least one membership class;

determining at least one mismodeling hypothesis by applying fuzzy inferencing to said class membership interval values, wherein said mismodeling hypothesis represents a possible cause of mismodeling; and generating at least one hypothesis certainty value representing a degree of certainty of said at least one mismodeling hypothesis.

18. The method of claim 17 wherein said physical phenomena includes a moving contact, wherein said at least one model is a contact tracking model, and wherein said at least one feature includes at least one tracking anomaly.

19. The method of claim 18 wherein said at least one tracking anomaly includes a jump feature representing a discontinuity in a measured tracking signal and includes drift feature representing a generally linear drift of said measured tracking signal.

20. The method of claim 17 wherein said at least one membership class includes null, weak, moderate or strong.

21. The method of claim 17 wherein said class membership interval values include an upper limit representing a greatest possible extent to which said at least one feature belongs to each said at least one membership class and includes a lower limit value representing a smallest necessary extent to which said at least one feature belongs to each said at least one membership class.

22. The method of claim 17 wherein the step of generating said at least one hypothesis certainty value includes generating hypothesis certainty interval values representing a range of certainty for said at least one mismodeling hypothesis.

23. The method of claim 17 wherein the steps of determining at least one mismodeling hypothesis and generating said hypothesis certainty interval values include:

providing a knowledge base including a plurality of rules for inferring mismodeling hypotheses based upon features and membership classes;

applying at least one rule from said knowledge base to said class membership interval values;

selecting at least one selected mismodeling hypothesis based upon said class membership interval values and said at least one rule; and generating hypothesis certainty interval values representing a range of certainty for said at least one selected mismodeling hypothesis.

24. The method of claim 23 wherein said inferencing module applies a plurality of rules that result in the same said at least one mismodeling hypothesis with different said hypothesis certainty interval values, and further including the step of:

aggregating said hypothesis certainty interval values to generate a composite hypothesis certainty interval value for said at least one mismodeling hypothesis.

25. A fuzzy inference system for use with a model assessment system to infer possible causes of mismodeling in at least one model of physical phenomena based upon at least one feature identified in measurement residual values, wherein said at least one feature is represented by at least one feature amplitude value and at least one feature amplitude standard deviation value, said system comprising:

an anomaly characterization module for characterizing said at least one feature in at least one membership class based upon said at least one feature amplitude value, and for generating class membership interval values for each said at least one membership class based upon said at least one feature amplitude standard deviation value, and wherein said class membership interval values represent a range of degrees of membership in each said at least one membership class and include an upper limit representing a greatest possible extent to which said at least one feature belongs to each said at least one membership class and includes a lower limit value representing a smallest necessary extent to which said at least one feature belongs to each said at least one membership class; and a hypothesis formulation and evaluation module for determining at least one mismodeling hypothesis by applying fuzzy inferencing to said class membership interval values, and for generating at least one hypothesis certainty value representing a degree of certainty of said at least one mismodeling hypothesis, wherein said hypothesis formulation and evaluation module includes (i) a knowledge base including a plurality of rules for inferring mismodeling hypotheses based upon features and membership classes;

(ii) an inferencing module for applying at least one rule from said knowledge base to said class membership interval values, for selecting at least one selected mismodeling hypothesis based upon said class membership interval values and said at least one rule, and for generating hypothesis certainty interval values representing a range of certainty for said at least one selected mismodeling hypothesis, wherein said inferencing module applies a plurality of rules that result in the same said at least one mismodeling hypothesis with different said hypothesis certainty interval values; and (iii) an aggregation module for aggregating said hypothesis certainty interval values to generate a composite hypothesis certainty interval value for said at least one mismodeling hypothesis.

26. A method of assessing at least one model of physical phenomena in response to a measured data sequence representing a signal caused by said physical phenomena in the presence of noise, said method comprising:

providing measurement residual values representing a difference between said measured data sequence and an expected data sequence corresponding to said model to be assessed;

identifying at least one feature present in said measurement residual values;

generating at least one feature amplitude value and at least one feature amplitude standard deviation value for said at least one feature identified;

characterizing said at least one feature in at least one membership class based upon said at least one feature amplitude value;

generating class membership interval values for each said at least one membership class based upon said at least one feature amplitude standard deviation value, and wherein said class membership interval values represent a range of degrees of membership in each said at least one membership class;

determining at least one mismodeling hypothesis by applying fuzzy inferencing to said class membership interval values, wherein said mismodeling hypothesis represents a possible cause of mismodeling;

generating at least one hypothesis certainty value representing a degree of certainty of said at least one mismodeling hypothesis; and using said at least one mismodeling hypothesis and said at least one hypothesis certainty value to assess said at least one model and generate a tactical picture.

* * * * *